(12) United States Patent
Ingesson et al.

(10) Patent No.: US 11,104,226 B2
(45) Date of Patent: Aug. 31, 2021

(54) INTER-AXLE DIFFERENTIAL ASSEMBLY, A DRIVING AXLE ASSEMBLY AND A MOTOR VEHICLE

(71) Applicant: Scania CV AB, Södertälje (SE)

(72) Inventors: Mattias Ingesson, Västerhaninge (SE); Tobias Bergdal, Skärholmen (SE)

(73) Assignee: Scania CV AB, Södertälje (SE)

( * ) Notice: Subject to any disclaimer, the term of this patent is extended or adjusted under 35 U.S.C. 154(b) by 8 days.

(21) Appl. No.: 16/310,763

(22) PCT Filed: May 19, 2017

(86) PCT No.: PCT/SE2017/050533
§ 371 (c)(1),
(2) Date: Dec. 17, 2018

(87) PCT Pub. No.: WO2017/222441
PCT Pub. Date: Dec. 28, 2017

(65) Prior Publication Data
US 2019/0176619 A1 Jun. 13, 2019

(30) Foreign Application Priority Data
Jun. 22, 2016 (SE) .................... 1650891-3

(51) Int. Cl.
*F16H 48/20* (2012.01)
*B60K 17/36* (2006.01)
(Continued)

(52) U.S. Cl.
CPC ............ *B60K 17/36* (2013.01); *B60K 17/165* (2013.01); *B60K 17/344* (2013.01);
(Continued)

(58) Field of Classification Search
CPC ... F16H 48/08–2048/087; F16H 48/05–48/20; F16H 48/12–18; F16H 48/24; B60K 23/08–2023/0883
See application file for complete search history.

(56) References Cited

U.S. PATENT DOCUMENTS

| 4,788,888 A | 12/1988 | Tsutsumikoshi |
| 6,450,915 B1 | 9/2002 | Kazaoka et al. |

(Continued)

FOREIGN PATENT DOCUMENTS

| CN | 204327902 U | 5/2015 |
| EP | 1860344 A1 | 11/2007 |

(Continued)

OTHER PUBLICATIONS

Scania CV AB, International Application No. PCT/SE2017/050533, International Search Report, dated Jun. 29, 2017.

(Continued)

*Primary Examiner* — Ernesto A Suarez
*Assistant Examiner* — Lillian T Nguyen
(74) *Attorney, Agent, or Firm* — Moore & Van Allen PLLC; W. Kevin Ransom

(57) ABSTRACT

An inter-axle differential assembly comprising a driving input shaft, a forward differential wheel, a rear differential wheel, a differential spider connected for common rotation with the input shaft and on which differential pinions configured to meshingly engage with said differential wheels are rotatably mounted, and a differential housing to which the differential spider is connected for common rotation. The assembly comprising an output wheel via which torque is transferable to a rear driving axle, and a connection means movable between: an open position which connects the output wheel to the rear differential wheel so that the differential housing can rotate independently of the rear (Continued)

differential wheel, a locking position connecting both of the differential housing and the output wheel to the rear differential wheel, and a disconnecting position connecting the differential housing to the rear differential wheel, so that the output wheel can rotate independently of the rear differential wheel.

19 Claims, 3 Drawing Sheets

(51) Int. Cl.
  *B60K 17/16* (2006.01)
  *B60K 23/08* (2006.01)
  *B60K 17/344* (2006.01)
  *B60K 17/346* (2006.01)
  *F16H 48/05* (2012.01)

(52) U.S. Cl.
  CPC ............ *B60K 17/346* (2013.01); *B60K 23/08* (2013.01); *B60K 23/0808* (2013.01); *F16H 48/05* (2013.01); *F16H 48/20* (2013.01); *B60K 2023/0883* (2013.01); *B60Y 2200/14* (2013.01); *B60Y 2200/142* (2013.01); *B60Y 2200/143* (2013.01); *B60Y 2200/1422* (2013.01)

(56) References Cited

U.S. PATENT DOCUMENTS

| | | | |
|---|---|---|---|
| 7,211,017 B2 | 5/2007 | Green et al. | |
| 8,651,994 B2 | 2/2014 | Bassi et al. | |
| 9,108,512 B2 | 8/2015 | Imafuku | |
| 2002/0137589 A1 | 9/2002 | Banno et al. | |
| 2005/0064978 A1* | 3/2005 | Moore | F16H 48/34 475/231 |
| 2006/0270510 A1* | 11/2006 | Pistagnesi | F16H 48/24 475/230 |
| 2012/0252621 A1* | 10/2012 | Seidl | B60W 10/02 475/150 |
| 2013/0085031 A1* | 4/2013 | Bassi | B60K 23/08 475/220 |
| 2014/0274542 A1 | 9/2014 | Schroeder et al. | |
| 2014/0309074 A1 | 10/2014 | Janson | |
| 2016/0131240 A1 | 5/2016 | Cooper | |

FOREIGN PATENT DOCUMENTS

| | | |
|---|---|---|
| EP | 2574490 A2 | 4/2013 |
| EP | 2796310 A1 | 10/2014 |
| EP | 2876332 B1 | 7/2020 |
| JE | 102008015227 A1 | 3/2009 |
| JP | S5881826 A | 5/1983 |
| JP | S6313332 U | 1/1988 |
| WO | 02096693 A2 | 12/2002 |

OTHER PUBLICATIONS

Scania CV AB, International Application No. PCT/SE2017/050533, Written Opinion, dated Jun. 29, 2017.

Scania CV AB, International Application No. PCT/SE2017/050533, International Preliminary Report on Patentability, dated Dec. 25, 2018.

Scania CV AB, European Application No. 17815801.0, Extended European Search Report, dated Apr. 15, 2020.

Scania CV AB, Chinese Application No. 201780038669.1, First Office Action, dated Jan. 6, 2021.

* cited by examiner

INTER-AXLE DIFFERENTIAL ASSEMBLY, A DRIVING AXLE ASSEMBLY AND A MOTOR VEHICLE

CROSS-REFERENCE TO RELATED APPLICATIONS

This application is a national stage application (filed under 35 § U.S.C. 371) of PCT/SE2017/050533, filed May 19, 2017 of the same title, which, in turn, claims priority to Swedish Application No. 1650891-3 filed Jun. 22, 2016; the contents of each of which are hereby incorporated by reference.

FIELD OF THE INVENTION

The present invention relates to an inter-axle differential assembly, to a driving axle system comprising such an inter-axle differential assembly, and to a motor vehicle. In particular, but not exclusively, the invention relates to an inter-axle differential assembly for use in a driving axle system in the form of a tandem bogie or a tridem bogie, i.e. a bogie with two and three driving axles, respectively.

BACKGROUND OF THE INVENTION

A conventional driving axle system in the form of e.g. a tandem or tridem bogie of a motor vehicle comprises two or more driving axles arranged to be driven by a single input shaft connected to a power source. In the case of a tandem bogie, the bogie comprises two driving axles which may be referred to as a forward-rear and a rear-rear driving axle. The forward-rear and rear-rear driving axle each include a pair of drive shafts on which one or more wheels of the motor vehicle are mounted. Each of the forward-rear and rear-rear driving axles further includes a differential gear set that allows the vehicle wheels on each driving axle to rotate at different speeds. Further, an axle gear system including means for distributing torque between the forward-rear and the rear-rear driving axles, such as an inter-axle differential assembly, is usually provided.

The inter-axle differential assembly allows the wheels of the two driving axles to rotate with mutually different rotational speeds and thereby compensates for slippage, cornering, mismatched tires, etc. Such an inter-axle differential assembly comprises a driving input shaft around which a forward differential wheel is rotationally mounted. It further comprises a rear differential wheel and a differential spider, mounted around and connected for common rotation with the input shaft, between the forward and the rear differential wheels. On the differential spider, differential pinions configured to meshingly engage with the differential wheels are rotatably mounted. The forward-rear driving axle is connected to the forward differential wheels by means of a set of different components, such that torque driving this axle is transferred via the forward differential gear. The output shaft is connected to the rear differential wheel, so that torque is transferred to the rear-rear driving axle via the rear differential wheel.

A locking mechanism may also be included in the inter-axle differential assembly. The locking mechanism can be used to lock e.g. the rear differential wheel and the differential spider together, thus forcing the rear differential wheel, and thereby also the forward differential wheel, to rotate at the same rotational speed as the input shaft. Thus, a selection can be made by a driver of the motor vehicle whether to allow the wheels of the rear-rear and the forward-rear driving axles to be driven at different rotational speeds or not.

EP2574490 discloses a driving axle system that comprises an inter-axle differential assembly including a locking mechanism such as described above, and further comprising a disengagement system for disengaging the rear-rear driving axle. The disengagement assembly comprises an intermediate shaft, connected as the output shaft of the inter-axle differential assembly. The intermediate shaft can, by means of a control device, be moved between a position in which it transmits torque to the output shaft driving the rear-rear driving axle, and a position in which it does not transmit any torque. One control device is used to control the locking mechanism and a separate control device is used to control the disengagement assembly.

SUMMARY OF THE INVENTION

It is a primary objective of the present invention to provide an, in at least some aspect, improved inter-axle differential assembly and driving axle system. Another objective is to provide an inter-axle differential assembly which enables disengagement of a rear driving axle in a tandem or a tridem drive system. Yet another objective is to provide an inter-axle differential assembly which allows selection between an open mode in which an input shaft and an output shaft are allowed to be driven at different rotational speeds, a locked mode in which the input shaft and the output shaft are forced to rotate with the same rotational speed, and a disconnected mode in which only a forward driving axle is driven, which inter-axle differential assembly is less complex and more robust than previously known such assemblies.

At least the primary objective is, according to a first aspect of the invention, achieved by means of an inter-axle differential assembly for distribution of torque between a forward driving axle and a rear driving axle in a motor vehicle according to claim 1. The inter-axle differential assembly comprises:

a driving input shaft,
a forward differential wheel rotationally mounted around the input shaft,
a rear differential wheel,
a differential spider mounted between the differential wheels and being connected for common rotation with the input shaft, on which differential spider differential pinions configured to meshingly engage with said differential wheels are rotatably mounted,
a differential housing to which the differential spider is connected for common rotation, wherein torque is transferable to the forward driving axle via the differential spider, the differential pinions and the forward differential wheel, and wherein the assembly further comprises an output wheel sharing a common axis of rotation with the input shaft, via which output wheel torque is transferable to the rear driving axle, and a connection means movable between:

an open position in which it connects the output wheel to the rear differential wheel for common rotation, and in which the differential housing can rotate independently of the rear differential wheel,
a locking position in which it connects both of the differential housing and the output wheel to the rear differential wheel for common rotation, and
a disconnecting position in which it connects the differential housing to the rear differential wheel for common rotation, and in which the output wheel can rotate independently of the rear differential wheel.

The inter-axle differential assembly according to the invention has a connection means that allows selecting between an open mode in which the input shaft and a rear output shaft driven by the output wheel are allowed to be driven at different rotational speeds, so that the forward driving axle and the rear driving axle can be driven at mutually different rotational speeds, a locked mode in which the input shaft and the rear output shaft are forced to rotate with the same rotational speed, and a disconnected mode in which only a forward driving axle is driven. All three modes can be activated using a single connection means. The inter-axle differential assembly thereby, by using a relatively small number of components, provides a robust and space efficient solution for achieving a possibility to select between an open mode, a locked mode and a disconnected mode.

In all three modes, torque is transferred via the spider, the pinions and the forward differential wheel to the set of components driving the forward driving axle. Such a set of components can e.g. comprise transfer gear members and a forward output shaft, e.g. in the form of a pinion, extending in parallel with the input shaft.

The output wheel is configured to drive a rear output shaft, which drives the rear driving axle. The output wheel and the rear output shaft may be formed in one piece, the output wheel forming an end region of the rear output shaft, but they may alternatively be formed as separate components connected for common rotation.

When the connection means is in the open position, torque is transferred from the input shaft via the spider, the differential pinions, the rear differential wheel and the connection means to the output wheel. The driving input shaft and the output wheel are allowed to be driven and to rotate at different rotational speeds. The rear output shaft, which is driven by the output wheel and which drives the rear driving axle, and a forward output shaft, which drives the forward driving axle, are thereby also allowed to rotate at different rotational speeds. Thus, also the wheels of the forward driving axle and the wheels of the rear driving axle are allowed to rotate at different rotational speeds.

When the connection means is in the locking position, torque is transferred from the input shaft via the differential spider, the differential housing and the connection means to the output wheel. The forward differential wheel rotates at the same rotational speed as the rear differential wheel, the differential spider and the input shaft. The driving input shaft and the output wheel, and thereby also the rear output shaft and a forward output shaft, are driven and rotate at the same rotational speed.

When the connection means is in the disconnecting position, no torque is transferred to the output shaft. The rear driving axle can be elevated off ground or used as a passive support axle, while the forward driving axle drives the motor vehicle.

Since the differential spider is arranged for common rotation with the differential housing, the differential housing may extend only between the differential wheels without overlapping the connection means. The differential housing can thereby be efficiently manufactured in one piece.

The connection means may be configured to be moved between the different positions by means of an actuator movable in an axial direction along the axis of rotation, wherein the actuator is configured to engage with the connection means. Since the actuator does not need to extend through the differential housing, it may be non-rotational. In other words, the actuator may be configured to be fixed with respect to the axis of rotation in each of the open position, the locking position and the disconnecting position. Furthermore, the actuator only needs to have one surface arranged for relative motion, namely an engagement surface configured to engage with a corresponding engagement surface within the connection means. The connection means may thereby rotate together with the rear differential wheel while the actuator is fixed. This enables a relatively simple and robust design of a control device including the actuator.

According to one embodiment of the invention, the connection means comprises a sleeve movable in an axial direction along said axis of rotation. By moving the sleeve in the axial direction, it can move to the three different positions.

According to one embodiment, said sleeve comprises internal splines configured to engage with external splines provided on the rear differential wheel and on at least one of the differential housing and the output wheel. Thus, the sleeve is mounted for common rotation with the rear differential wheel by means of the splines. At least one of the output wheel and the differential housing are also provided with mating external splines. The splines provide a reliable and robust connection. If only one of the output wheel and the differential housing are provided with external splines, locking between the other component and the sleeve is achieved by other locking means.

According to one embodiment, both of the differential housing and the output wheel have external splines configured to selectively engage with the internal splines of the sleeve. The sleeve can thus slide over externally splined portions on the differential housing, the differential wheel and the output shaft. This is a robust and space efficient solution.

According to one embodiment, the sleeve comprises internal splines configured to engage with external splines provided on the rear differential wheel, and the sleeve and at least one of the differential housing and the output wheel have end faces provided with teeth configured to selectively engage with each other. This is an alternative configuration in the form of a dog clutch. It is possible to provide end faces with teeth on both of the differential housing and the output wheel. The sleeve has in this case teeth provided on both its end faces.

According to one embodiment, the differential spider comprises a central portion arranged around the input shaft and bearing pins extending from the central portion, the differential pinions being arranged on said bearing pins, wherein outer ends of said bearing pins are in locking engagement with recesses formed in the differential housing. The differential housing is thus efficiently locked for common rotation with the differential spider and the components are also easy to assemble and disassemble. Locking engagement can be provided by means of mating geometrical shapes, such as rounded outer ends and correspondingly rounded recesses. As an alternative or as a complement, fastening means in the form of e.g. screws, bolts or similar, may be provided for locking the differential housing and the differential spider together. The differential housing may sometimes be referred to as a differential cage.

According to one embodiment, the assembly further comprises a control device configured to move said connection means between the open position, the locking position and the disconnecting position upon receipt of a signal. Thus, a driver of the motor vehicle may easily provide a signal, e.g. by adjusting a knob or similar, that it is desired to drive in a specific mode and that the connection means should be moved to the corresponding position.

According to one embodiment, the input shaft is supported in the rear differential wheel by means of a bearing, preferably a tapered rolling bearing. The tapered rolling bearing can absorb both radial and axial forces between the input shaft and the rear differential wheel and is therefore suitable for this application. Alternatively, a combination of radial and axial bearings can be used.

According to one embodiment, the rear differential wheel is supported in the output wheel by means of a bearing, preferably a tapered rolling bearing. Both radial and axial forces can thereby be absorbed. Alternatively, a combination of radial and axial bearings can be used.

According to one embodiment, the output wheel is configured to be connected for common rotation with a rear output shaft. The connection can be achieved by means of e.g. splines. The rear output shaft is in this case received in the output wheel. By forming the output wheel and the rear output shaft as two different components connected for common rotation, the inter-axle differential assembly is easier to handle and mount than in the case when the output wheel is integrated with the rear output shaft.

According to another aspect of the invention, at least the above mentioned primary objective is achieved by means of a driving axle system comprising at least one proposed inter-axle differential assembly, at least one forward driving axle to which torque is transferable via the forward differential wheel, and at least one rear driving axle to which torque is transferable via the output wheel. Advantages and advantageous features of such a driving axle system appear from the above discussion in connection with the proposed inter-axle differential assembly. Of course, it is possible to also have a foremost driving axle, located at a front of the motor vehicle, which does not form part of this driving axle system.

According to one embodiment, the driving axle system is a tandem drive system. Such a system has two driving axles coupled to a single inter-axle differential assembly.

The invention also relates to a motor vehicle comprising the proposed driving axle system, preferably wherein the motor vehicle is a heavy motor vehicle such as a bus or a truck, e.g. a long haulage truck adapted to transport cargo on a trailer, a military truck, a construction or distribution truck, a truck for use in forestry, mining, etc. The motor vehicle may be a motor vehicle powered by an internal combustion engine, or a motor vehicle entirely or partly powered by an electric power source, such as a hybrid vehicle.

Other advantageous features as well as advantages of the present invention will appear from the following description.

BRIEF DESCRIPTION OF THE DRAWINGS

The invention will in the following be further described by means of example with reference to the appended drawings, wherein FIG. 1 schematically shows a motor vehicle having a driving axle system according to an embodiment of the invention.

DETAILED DESCRIPTION OF THE INVENTION

Figure 1:
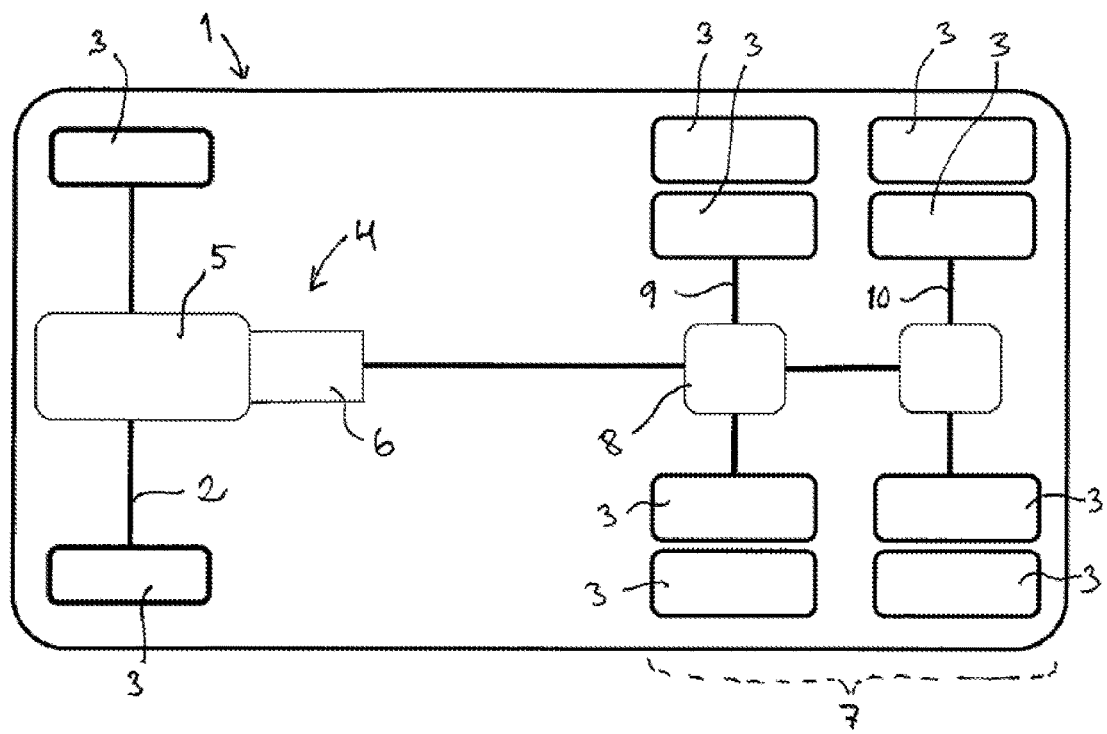

An exemplary motor vehicle 1 according to an embodiment of the invention is schematically shown in FIG. 1. The motor vehicle 1 comprises a front axle 2 configured to steer the vehicle and a pair of front wheels 3 mounted thereon. It further comprises a powertrain 4 including an engine 5, a transmission 6 and a driving axle system 7. The driving axle system 7 is arranged towards a rear end portion of the vehicle 1. The driving axle system 7 comprises an inter-axle differential assembly 8, a forward driving axle 9 and a rear driving axle 10. To each driving axle 9, 10, a wheel assembly including four wheels 3 is mounted, such that the motor vehicle 1 in total includes ten wheels 3 distributed between three axles 2, 9, 10. Alternatively, the vehicle 1 may have a different number of wheels.

Each driving axle 9, 10 may or may not include an axle differential enabling rotation of the left and right wheel assemblies at mutually different rotation speeds. Such configurations are well known in the art and will not be further discussed herein.

Figure 2:
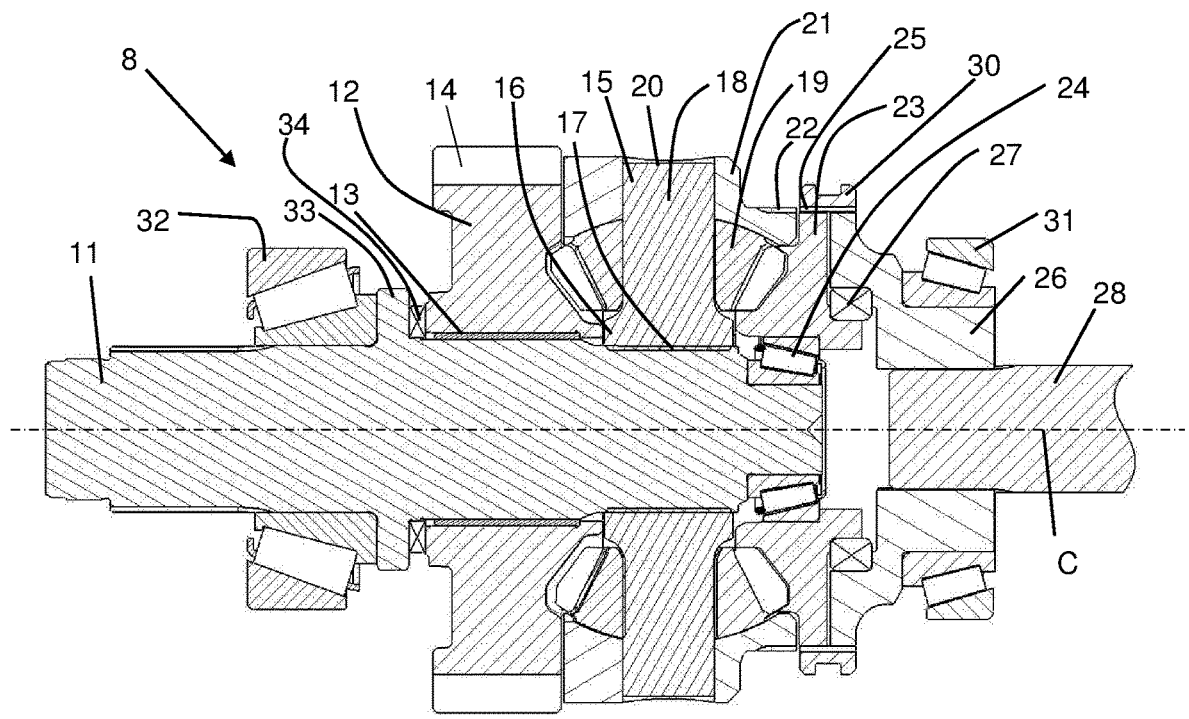
FIG. 2 shows a cross section of an inter-axle differential assembly according to an embodiment of the invention in an open mode.
Figure 3:
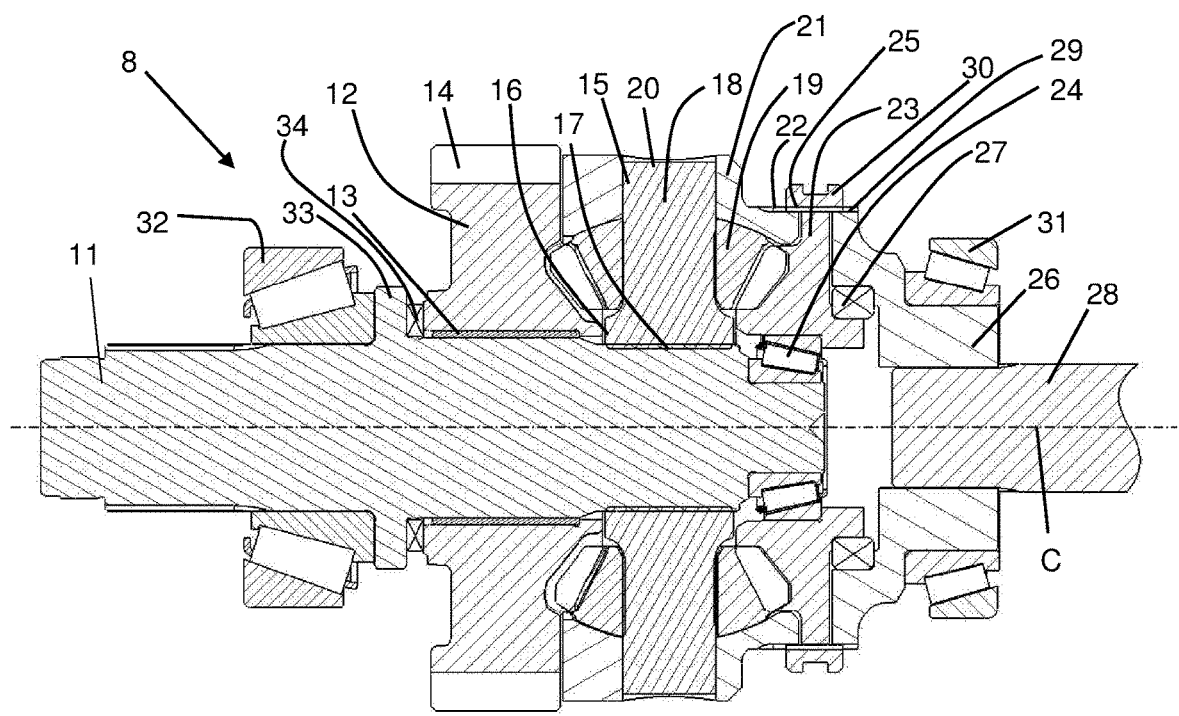
FIG. 3 shows a cross section of the inter-axle differential assembly from FIG. 2 in a locked mode.
Figure 4:
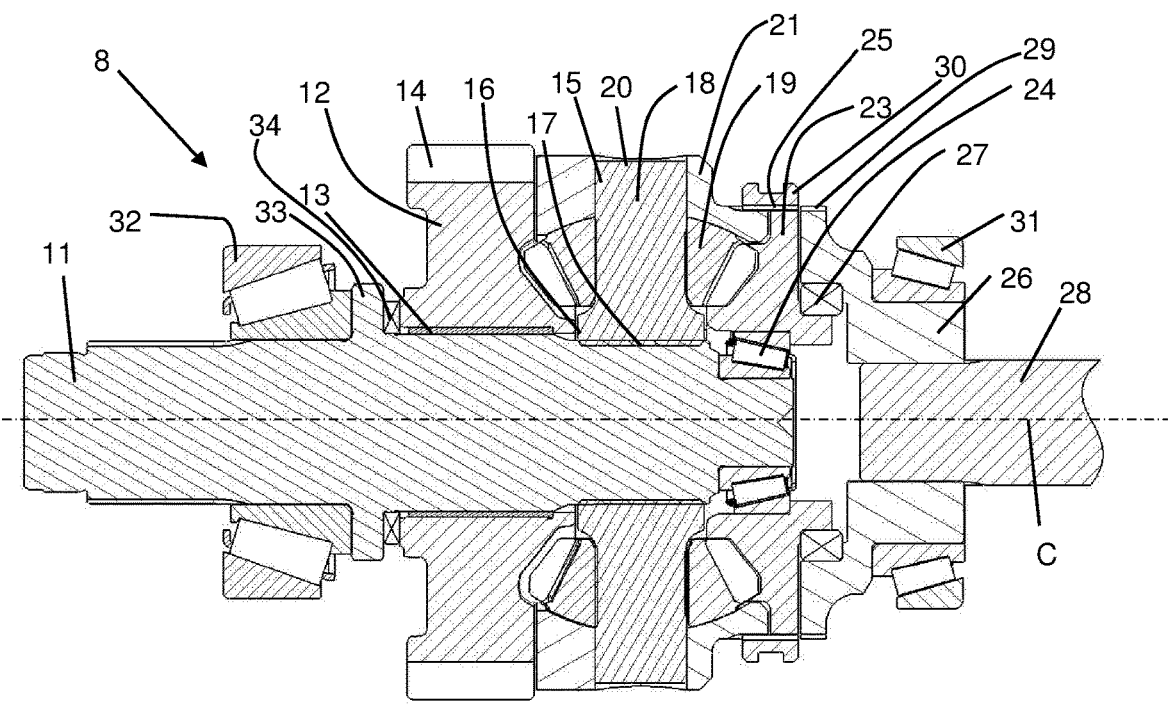
FIG. 4 shows a cross section of the inter-axle differential assembly from FIG. 2 in a disconnected mode, and FIGS. 5a-c schematically show cross sections of parts of a connection means according to an embodiment of the invention.

An inter-axle differential assembly 8 according to an embodiment of the invention is shown in a longitudinal cross section in FIGS. 2-4. A driven input shaft 11, hereinafter only referred to as an input shaft, having a longitudinal axis of rotation C, is provided for transmission of torque from the engine 5 to the driving axle system 7. The input shaft 11 is connected to the transmission 6 of the relevant motor vehicle 1 and is thus driven by the engine 5 via the transmission 6. A forward differential wheel 12 is rotationally mounted around the input shaft 11 by means of a bushing 13, and is thereby allowed to rotate around the input shaft 11. Alternatively, a needle roller bearing providing the same function may be used. The forward differential wheel 12 has external cylindrical teeth 14 for transmitting torque to the forward driving axle 9 via a transfer gear (not shown). The cylindrical teeth 14 are thereby configured to meshingly engage with corresponding teeth of the transfer gear, such that driving torque can be transmitted to the forward driving axle via a forward output shaft (not shown) and, if present, a forward axle differential.

Rearward of the forward differential wheel 12 in the direction of travel of the motor vehicle, a differential spider 15 is provided. The differential spider 15 has a central portion 16 mounted for common rotation with the input shaft 11 by means of splines 17. Four bearing pins 18, on which differential pinions 19 are rotationally mounted, are formed in one piece with the central portion 16 and extend therefrom in a radial direction. In other words, the central portion 16 and the bearing pins 18 of the differential spider 15 are configured to rotate together with the input shaft 11, at the same rotational speed. The differential pinions 19 are configured to rotate around the bearing pins 18, thus having an axis of rotation that extends radially outward from the central portion 16 of the differential spider 15. Outer ends 20 of the bearing pins 16 are in locking engagement with recesses formed in a differential housing 21 mounted for common rotation with the differential spider 15. The differential housing 21, the differential spider 15 and the input shaft are thereby configured to rotate together around the axis of rotation C. The forward differential wheel 12 has a set of teeth configured to meshingly engage with the differential pinions 19 such that a rotation of the differential spider 15 around the axis of rotation C leads to a rotation of the forward differential wheel 12 via the differential pinions 19. The differential housing 21 can e.g. be annular, enclosing the differential spider 15. On a rear portion of the differential housing 21, splines 22 are provided around a periphery of the housing 21.

On the rearward side of the differential spider 15, a rear differential wheel 23 is provided. The rear differential wheel 23 receives an end portion of the input shaft 11, which is rotationally mounted in the rear differential wheel 23 by means of a tapered rolling bearing 24 having cylindrically shaped rolling elements. The rolling elements may alternatively have a frustoconical shape. Similar to the forward differential wheel 12, the rear differential wheel 23 has a set of teeth configured to meshingly engage with the differential pinions 19 such that a rotation of the differential spider 15 around the axis of rotation C leads to a rotation of the rear differential wheel 23 around the axis of rotation C. The rear differential wheel 23 further has external splines provided around its periphery.

An output wheel 26 is provided rearward of the rear differential wheel 23 in the direction of travel of the motor vehicle. A bearing 27 is provided between the rear differential wheel 23 and the output wheel 26, e.g. in the form of a tapered rolling bearing, such that the rear differential wheel 23 and the output wheel 26 may rotate with different rotational speeds if not otherwise connected. The output wheel 26 receives a rear output shaft 28, which is spaced apart from the input shaft 11 and which shares the longitudinal axis of rotation C of the input shaft 11. On a periphery of the output wheel 26, splines 29 are provided (see FIGS. 3-4). The rear output shaft 28 is configured to rotate together with the output wheel 26 at the same rotational speed.

A connection means in the form of a sleeve 30 having internal splines 25 is mounted around the rear differential wheel 23, such that the internal splines 25 of the sleeve 30 engage with the external splines of the rear differential wheel 23 and can simultaneously engage with the external splines 22 of the differential housing 21 and/or the external splines 29 of the output wheel 26. The sleeve 30 is movable in the axial direction, i.e. along the axis of rotation C, by means of a control device (not shown) between an open position shown in FIG. 2, a locking position shown in FIG. 3, and a disconnecting position shown in FIG. 4.

When the sleeve 30 is in the open position shown in FIG. 2, it connects the rear differential wheel 23 and the output wheel 26 and forces them to rotate at the same rotational speed. The differential housing 21, and thereby also the differential spider 15, are not connected to the rear differential wheel 23 via the sleeve 30 and may therefore rotate at a different rotational speed. The forward differential wheel 12, driving the forward driving axle 9, and the rear differential wheel 23, driving the rear driving axle 10, can thereby also rotate at mutually different rotational speeds, allowing compensation for slippage etc. between the wheels 3 of the forward driving axle 9 and the rear driving axle 10, respectively.

When the sleeve 30 is in the locking position shown in FIG. 3, it connects the rear differential wheel 23 and both of the output wheel 26 and the differential housing 21. The sleeve 30 thereby forces the output wheel 26 and the rear differential wheel 23 to rotate at the same speed as the differential spider 15, and consequently also as the input shaft 11. Since the rear differential wheel 26 is locked for common rotation with the differential spider 15, the forward differential wheel 12 is also forced to rotate at the same rotational speed. Thus, the forward output shaft driving the forward driving axle 9 and the rear output shaft 28 driving the rear driving axle 10 are forced to rotate with mutually equal rotational speeds. In this mode, no compensation for slippage etc. between the wheels 3 of the forward driving axle 9 and the rear driving axle 10 via the inter-axle differential assembly 8 is possible. A forward and a rear axle differential (not shown) allowing the left and right wheel assemblies to rotate at mutually different rotational speeds may however be provided.

When the sleeve 30 is in the disconnecting position shown in FIG. 4, it connects the rear differential wheel 23 and the differential housing 21, but allows the output wheel 26 to rotate independently of the rear differential wheel 23 and the differential housing 21, and thereby also of the input shaft 11. No torque is thus transferred to the rear output shaft 28 and the rear driving axle 10. Instead, all torque is transmitted to the forward driving axle 9. The rear driving axle 10 can in this mode be elevated off ground or used as a passive support axle.

The output wheel 26 and the input shaft 11 are rotationally mounted in an assembly housing (not shown) by means of tapered rolling bearings 31, 32. A collar 33 provided on the input shaft 11 between the bearing 32 and the forward differential wheel 12 prevents the input shaft 11 from axial movement. A bearing 34 is provided between the collar 33 and the forward differential wheel 12.

Figure 5A:
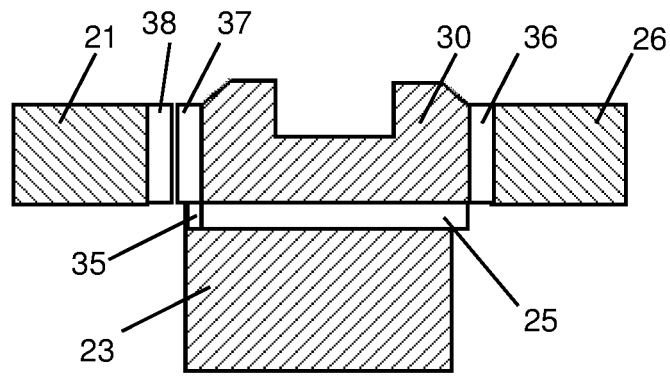
Figure 5B:
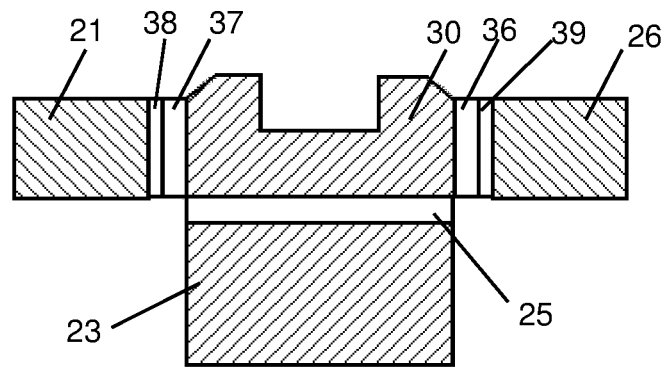
Figure 5C:
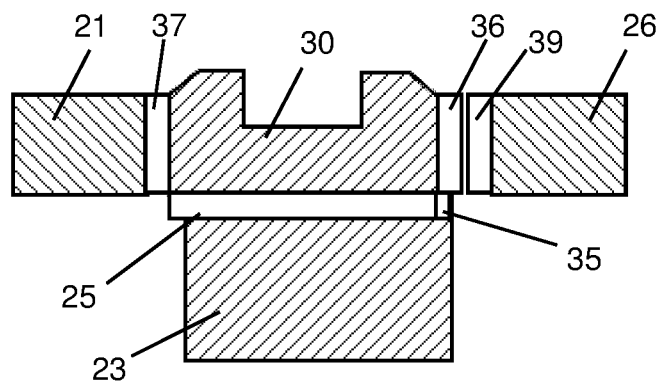

A connection means according to a different embodiment of the invention is schematically shown in FIGS. 5a-c. The connection means comprises a sleeve 30 having internal splines 25 configured to engage with external splines 35 provided on the rear differential wheel 23. The sleeve 30 further has end faces in the axial direction provided with teeth 36, 37. The differential housing 21 has an end face provided with teeth 38, with which the teeth 37 of the sleeve are configured to be brought into locking engagement upon axial movement of the sleeve 30. The output wheel 26 also has an end face provided with teeth 39, with which the teeth 36 of the sleeve are configured to be brought into locking engagement upon axial movement of the sleeve 30.

In FIG. 5a, the connection means is shown in the open position, in which the teeth 36 of the sleeve 30 are in locking engagement with the teeth 39 of the output wheel 26, thus locking the output wheel 26 and the rear differential wheel 23 together for common rotation, while the differential spider 21 is allowed to rotate at a different rotational speed.

In FIG. 5b, the connection means is shown in the locking position, in which the teeth 36 of the sleeve 30 are in locking engagement with the teeth 39 of the output wheel 26 and the teeth 37 of the sleeve 30 are in locking engagement with the teeth 38 of the differential housing 21, so that all of the output wheel 26, the rear differential wheel 23 and the differential spider 21 are forced to rotate with the same rotational speed. In this position, the teeth 36, 37 of the sleeve 30 are engaged half-ways with the teeth 38 of the differential housing 21 and the teeth 39 of the output wheel 26, respectively.

In FIG. 5c, the connection means is shown in the disconnecting position, in which the teeth 37 of the sleeve 30 are in locking engagement with the teeth 38 of the differential housing 21, forcing the differential housing 21 and the rear differential wheel 23 to rotate together, and in which the output wheel 26 is disconnected.

The front axle configured to steer the vehicle may also be configured as a driving axle, in which case the vehicle comprises at least three driving axles.

The invention is of course not in any way restricted to the embodiments described above, but many possibilities to modifications thereof would be apparent to a person with skill in the art without departing from the scope of the invention as defined in the appended claims.

The invention claimed is:

1. An inter-axle differential assembly for distribution of torque between a forward driving axle and a rear driving axle in a motor vehicle, said assembly comprising:
   a driving input shaft;
   a forward differential wheel rotationally mounted around the driving input shaft;
   a rear differential wheel;
   a differential spider mounted between the differential wheels and being connected for common rotation with the driving input shaft, on which differential spider differential pinions configured to meshingly engage with said differential wheels are rotatably mounted;
   a differential housing, wherein the differential spider is connected to said differential housing, such that the differential spider and differential housing have common rotation, wherein torque is transferable to the forward driving axle via the differential spider, the differential pinions and the forward differential wheel;
   an output wheel sharing a common axis of rotation with the driving input shaft and configured to be connected for common rotation with a rear output shaft, via which output wheel torque is transferable to the rear driving axle, and wherein the rear differential wheel is supported in the output wheel by means of a bearing; and
   a connection means movable between:
      an open position in which it connects the output wheel to the rear differential wheel for common rotation, and in which the differential housing can rotate independently of the rear differential wheel;
      a locking position in which it connects both of the differential housing and the output wheel to the rear differential wheel for common rotation; and
      a disconnecting position in which it connects the differential housing to the rear differential wheel for common rotation, and in which the output wheel can rotate independently of the rear differential wheel.

2. The inter-axle differential assembly according to claim 1, wherein the connection means comprises a sleeve movable in an axial direction along said axis of rotation.

3. The inter-axle differential assembly according to claim 2, wherein said sleeve comprises internal splines configured to engage with external splines provided on the rear differential wheel and on at least one of the differential housing and the output wheel.

4. The inter-axle differential assembly according to claim 3, wherein both of the differential housing and the output wheel have external splines configured to selectively engage with the internal splines of the sleeve.

5. The inter-axle differential assembly according to claim 2, wherein the sleeve comprises internal splines configured to engage with external splines provided on the rear differential wheel, and wherein the sleeve and at least one of the differential housing and the output wheel have end faces provided with teeth configured to selectively engage with each other.

6. The inter-axle differential assembly according to claim 1, wherein the differential spider comprises a central portion arranged around the driving input shaft and bearing pins extending from the central portion, the differential pinions being arranged on said bearing pins, and wherein outer ends of said bearing pins are in locking engagement with recesses formed in the differential housing.

7. The inter-axle differential assembly according to claim 1, further comprising a control device configured to move said connection means between the open position, the locking position and the disconnecting position upon receipt of a signal.

8. The inter-axle differential assembly according to claim 1, wherein the driving input shaft is supported in the rear differential wheel by means of a second bearing.

9. The inter-axle differential assembly according to claim 1, wherein the bearing supporting the rear differential wheel in the output wheel is a tapered rolling bearing.

10. A driving axle system comprising:
    at least one forward driving axle;
    at least one rear driving axle; and
    an inter-axle differential assembly for distribution of torque between the forward driving axle and the rear driving axle, said assembly comprising:
       a driving input shaft;
       a forward differential wheel rotationally mounted around the driving input shaft;
       a rear differential wheel;
       a differential spider mounted between the differential wheels and being connected for common rotation with the driving input shaft, on which differential spider differential pinions configured to meshingly engage with said differential wheels are rotatably mounted;
       a differential housing, wherein the differential spider is connected to said differential housing, such that the differential spider and differential housing have common rotation, wherein torque is transferable to the forward driving axle via the differential spider, the differential pinions and the forward differential wheel;
       an output wheel sharing a common axis of rotation with the driving input shaft and configured to be connected for common rotation with a rear output shaft, via which output wheel torque is transferable to the rear driving axle, and wherein the rear differential wheel is supported in the output wheel by means of a bearing; and
       a connection means movable between:
          an open position in which it connects the output wheel to the rear differential wheel for common rotation, and in which the differential housing can rotate independently of the rear differential wheel;
          a locking position in which it connects both of the differential housing and the output wheel to the rear differential wheel for common rotation; and
          a disconnecting position in which it connects the differential housing to the rear differential wheel for common rotation, and in which the output wheel can rotate independently of the rear differential wheel.

11. A driving axle system according to claim 10, wherein the driving axle system is a tandem drive system.

12. A driving axle system according to claim 10, wherein the connection means comprises a sleeve movable in an axial direction along said axis of rotation.

13. A driving axle system according to claim 12, wherein said sleeve comprises internal splines configured to engage with external splines provided on the rear differential wheel and on at least one of the differential housing and the output wheel.

14. A driving axle system according to claim 13, wherein both of the differential housing and the output wheel have external splines configured to selectively engage with the internal splines of the sleeve.

15. A motor vehicle comprising driving axle system comprising:
- at least one forward driving axle;
- at least one rear driving axle; and
- an inter-axle differential assembly for distribution of torque between the forward driving axle and the rear driving axle, said assembly comprising:
  - a driving input shaft;
  - a forward differential wheel rotationally mounted around the driving input shaft;
  - a rear differential wheel;
  - a differential spider mounted between the differential wheels and being connected for common rotation with the driving input shaft, on which differential spider differential pinions configured to meshingly engage with said differential wheels are rotatably mounted;
  - a differential housing, wherein the differential spider is connected to said differential housing, such that the differential spider and differential housing have common rotation, wherein torque is transferable to the forward driving axle via the differential spider, the differential pinions and the forward differential wheel;
  - an output wheel sharing a common axis of rotation with the driving input shaft and configured to be connected for common rotation with a rear output shaft, via which output wheel torque is transferable to the rear driving axle, and wherein the rear differential wheel is supported in the output wheel by means of a bearing; and
  - a connection means movable between:
    - an open position in which it connects the output wheel to the rear differential wheel for common rotation, and in which the differential housing can rotate independently of the rear differential wheel;
    - a locking position in which it connects both of the differential housing and the output wheel to the rear differential wheel for common rotation; and
    - a disconnecting position in which it connects the differential housing to the rear differential wheel for common rotation, and in which the output wheel can rotate independently of the rear differential wheel.

16. A motor vehicle according to claim 15, wherein the connection means comprises a sleeve movable in an axial direction along said axis of rotation.

17. A motor vehicle according to claim 16, wherein said sleeve comprises internal splines configured to engage with external splines provided on the rear differential wheel and on at least one of the differential housing and the output wheel.

18. A motor vehicle according to claim 17, wherein both of the differential housing and the output wheel have external splines configured to selectively engage with the internal splines of the sleeve.

19. A motor vehicle according to claim 15, wherein the motor vehicle is a heavy motor vehicle.

* * * * *